United States Patent [19]
Asmus

[11] 3,964,879
[45] June 22, 1976

[54] FASTENER FOR JOINING ARTICLES

[76] Inventor: James F. Asmus, Rte. 1, Box 46A, East Liberty, Ohio 43319

[22] Filed: May 21, 1974

[21] Appl. No.: 472,052

Related U.S. Application Data

[63] Continuation-in-part of Ser. No. 224,569, Feb. 8, 1972, abandoned.

[52] U.S. Cl. .............................. 29/183.5; 29/193.5; 85/19; 85/63; 151/14.5; 151/22
[51] Int. Cl.² .......................................... F16B 39/30
[58] Field of Search .................. 29/183, 193, 193.5, 29/183.5; 85/19, 63; 151/22, 14.5

[56] References Cited
UNITED STATES PATENTS

| | | | |
|---|---|---|---|
| 1,891,895 | 12/1932 | Nagel | 85/19 X |
| 2,223,871 | 12/1940 | Johnson | 85/19 |
| 2,405,402 | 8/1946 | Carter | 151/22 |
| 2,842,180 | 7/1958 | Brown et al. | 151/22 |
| 3,454,070 | 7/1969 | Phipard, Jr. | 151/22 |
| 3,489,195 | 1/1970 | Mortus | 151/22 |
| 3,530,920 | 9/1970 | Podell | 151/22 |

FOREIGN PATENTS OR APPLICATIONS 459,875   10/1950   Italy ...................................... 151/22

Primary Examiner—Arthur J. Steiner
Attorney, Agent, or Firm—Finnegan, Henderson, Farabow & Garrett

[57] ABSTRACT

A fastener for joining articles by insertion into a cavity. The fastener includes an elongated portion having a plurality of parallel ridges that are also parallel to the longitudinal axis of the elongated portion. The grooves between the ridges have a constant cross-sectional area and a sequential change in cross-sectional shape. When the fastener is placed within the cavity, the material defining the cavity flows into the grooves and is sequentially deformed by the change in cross-sectional shape of the grooves. Extraction of the fastener from the cavity requires reversal of the material flow and provides substantial resistance to such extraction.

5 Claims, 5 Drawing Figures

FASTENER FOR JOINING ARTICLES

CROSS REFERENCE TO RELATED APPLICATION

This is a continuation-in-part application of U.S. patent application Ser. No. 224,569 filed Feb. 8, 1972, now abandoned.

BACKGROUND OF THE INVENTION

This invention relates to a concept for the design of the first of two close-fitting articles so that upon forced mating with the second article, material deformation occurs in the second article in such a manner that the deformation must be reversed to accomplish separation thus causing the mated articles to be restrained from separation by a resistance which is dependent on the plastic properties of the second article rather than the frictional resistance between the two articles.

SUMMARY OF THE INVENTION

The present invention is a fastener envisions the first article bestowed, on at least one of its mating surfaces, with two or more ridges substantially parallel to the path of engagement of the articles and with an area between each pair of ridges hereinafter referred to as a groove which is of substantially constant cross-sectional area but of varying cross-sectional shape over some portion of the length of engagement. During mating of the fastener, material defining a cavity is introduced into one end of the grooves(s) of the first article and, as engagement proceeds, is deformed to comply with the groove cross-sectional shape of the groove over the engaged length. As the groove cross-sectional shape of the groove varies along the groove length, the article defining the cavity may no longer be separated from the fastener without reversal of the deformation of the cavity. The concept of the present invention envisions the fastener shaped in any of several forms including planar, cylindrical, rectangular, hexagonal, square and triangular members having ridges and grooves on one or more of the article surfaces. The present invention further envisions that, when disassembly and re-assembly are desirable, the groove(s) of the first article (fastener) can be configured so that a substantial portion of the deformation of the second article defining the cavity occurs within the range of plastic deformation or flow of the material of the second article. The present invention further envisions groove designs which, during mating, cause reversal in the direction of the deformation of the material of the second article.

It is an object of the invention to provide a simple means of fastening two articles with the separation being characterized as requiring the application of substantial separating force.

It is another object of the invention to provide a means of fastening two articles in a manner that separation is not abrupt or catastrophic, and where the force needed to effect separation does not diminish suddenly once the separation is initiated but decreases at a relatively constant rate until there is a complete separation.

DETAILED DESCRIPTION OF THE DRAWINGS

Figure 1:
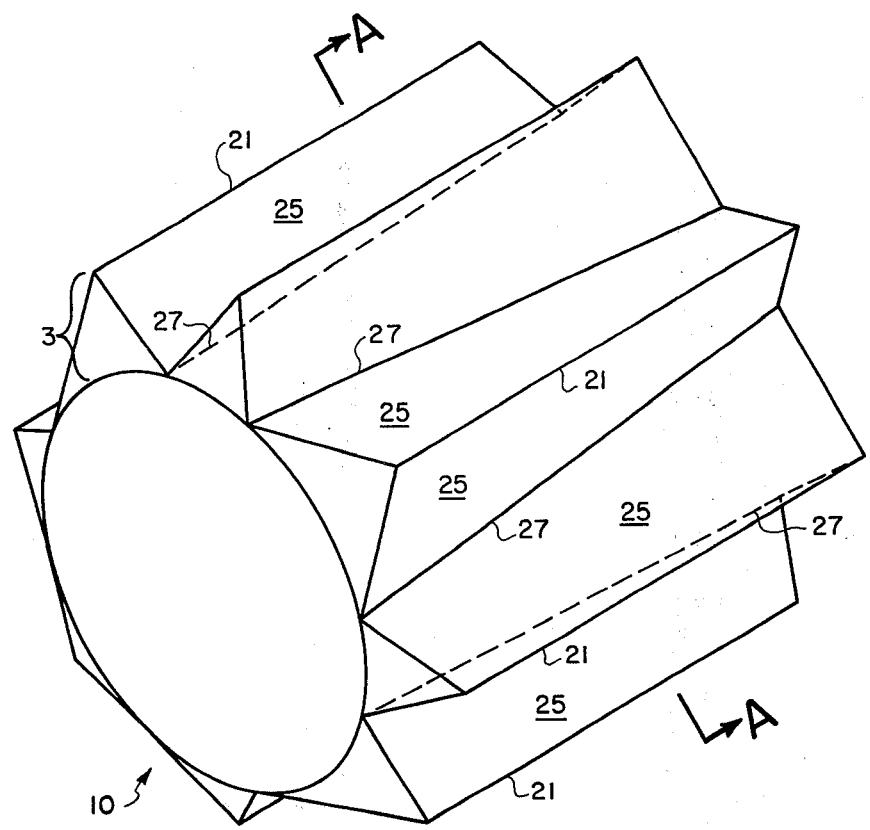
FIG. 1 is a perspective view of a cylindrical male member utilizing the present invention as a means of joining the male member to a separate member having a cylindrical cavity therein.

One embodiment of the present invention as used to fasten two members in locking engagement consists of a male member 10 as shown in FIG. 1 where the member 10 has a plurality of ridges and grooves running substantially along the member in its longitudinal direction. The member 10 has a plurality of ridges 21 on the outer surface thereof with the ridges being defined by the intersection of the surfaces 25. The surfaces 25 intersect to form a ridge 21, which ridge is substantially parallel to the longitudinal axis of the member 10. Where the surfaces 25 intersect between the ridges 21, the line of intersection deviates from that of the ridges 21 to form grooves 27 having an angular disposition from that of the ridges 21 and the longitudinal axis of the member 10. The grooves 27 are so arranged so that any two adjacent grooves will converge at an angle bisected by the ridge 21 found between two grooves.

Figure 2:
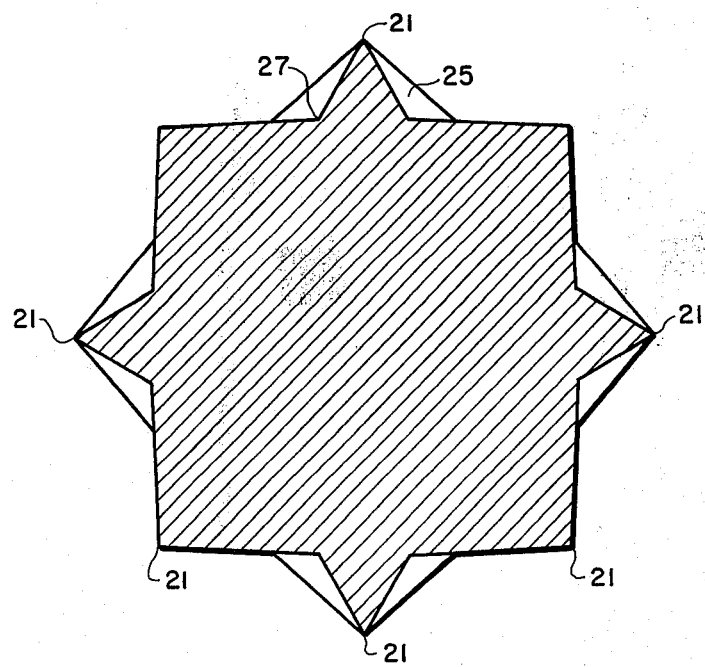
FIG. 2 is a cross section of the member of FIG. 1 illustrating the form of the non-parallel grooves.

FIG. 2 is a sectional view of the member 10 at right angles to its longitudinal direction at A—A. This view illustrates the configuration of the parallel ridges 21 and the interesection of the surfaces 25 in such a manner as to make the grooves 27 converge (or diverge—depending on which pair is selected) in pairs on sides opposite the ridge 21.

The arrangement of the grooves 27 provides the member with symmetry about its longitudinal axis and therefore the member 10 will not rotate upon insertion since the induced circumferential metal flows create forces that all cancel producing zero net torque. The alignment of the ridges 21 may angle with respect to the longitudinal axis and this will induce rotation of the member 10 upon insertion.

Figure 3:
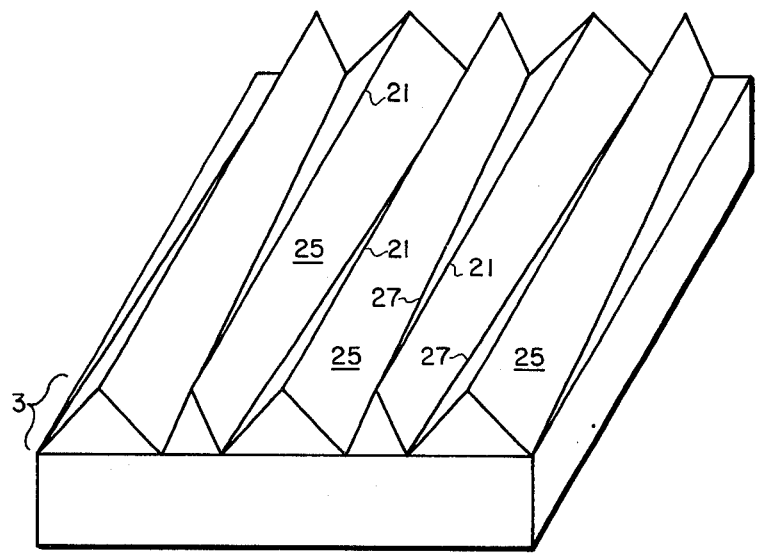
FIG. 3 is an elevated view of a rectangular male member utilizing the present invention.

FIG. 3 is an embodiment of the present invention with the ridges 21 and grooves 27 formed on a planar surface. Such a member need not have all surfaces so shaped and as shown only one surface has the ridges and grooves to induce material deformation upon insertion.

In this embodiment it can be seen that the surfaces 25 are not planar but are best described as being warped or twisted plane surfaces. The cross-sectional area of the grooves remains substantially constant the length of the member while the change in cross-sectional shape of the grooves induces metal flow in a direction lateral to the insertion direction that creates the substantial resistance to extraction.

Figure 4:
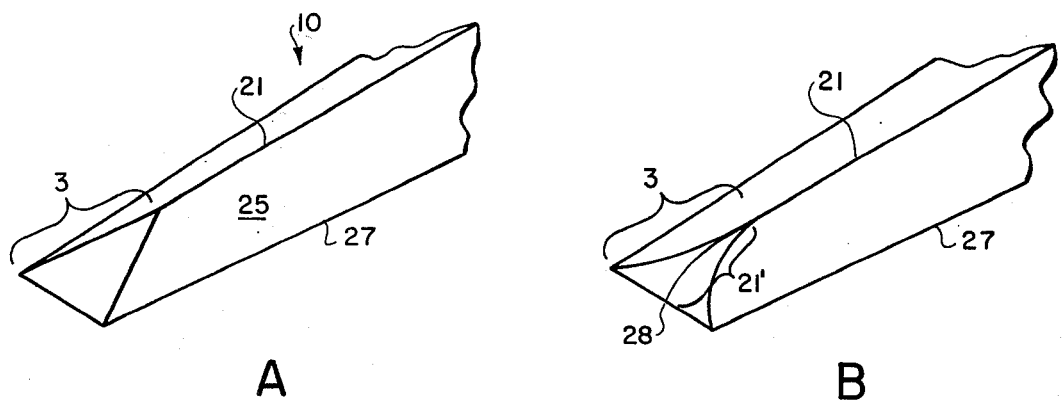
FIGS. 4A and B illustrates two possible means of forming the entry portion of the member to promote material flow to the valleys.

FIG. 4 shows two different configurations of a fastener end where the end of the ridge is disposed to direct metal flow to the valleys adjacent the ridge. View A shows a simple chamfer while View B shows a contoured ridge having the surfaces 25 on each side of the ridge 21 terminate at the entry portion 3 of the member on an extension 21' of the ridge 21 that intersects the entry portion 3 at 28. The shape of the contoured ridge as shown in FIG. 4B where the deflecting means is an arcuate termination 21' of the ridge 21 with the ridge extension 21' separating the metal in interference with the ridge extension 21' and forcing it to flow into the grooves 27 on each side of the ridge extension 21' and on further insertion of the member 10 onto each side the ridge 21. The shape of the entry portion 3 of the member 10 influences the material deformation taking place upon insertion of the member 10 into the cavity where joining takes place. Upon insertion of the member into the cavity the interference between the ridges and the cavity walls induces material to flow axially in the direction of insertion and accumulate just ahead of the advancing member. Some of the metal is induced by the ridges to flow laterally toward the grooves where the shape of the grooves induces further lateral material flow upon continued insertion that results in the joining of the two articles. Members having a 45° chamfer were found to induce large amounts of axial material flow in addition to the lateral material flow except where the cross-sectional area of the cavity was greater than that of the member inserted thereby reducing the interference between the cavity walls and the entry portion 3 of the member. Where the cavity area was equal to or less than the area of the member, a joining took place; however, excessive axial material flow as induced resulting in high insertion forces.

Except when a male member is completely encased in a "cavity" the total area of the member in relation to the cavity does not indicate if the grooves between the ridges will be filled completely.

In order to define the relative deformation in both embodiments, it is necessary to use the volume of material displaced by the ridges and the volume between the ridges available to accommodate the displaced material. Where the volume of metal displaced by the ridges is greater than the volume of the available space between the ridges, then the excess metal will flow in the direction of insertion. Where the volumes are substantially equal, then the material flow will be primarily lateral and the resulting union will have a high resistance to extraction as well as requiring a low insertion force. When the volume of displaced material is substantially less than the volume available between the ridges, then the extraction force will be reduced since the material flow induced by extraction is less than when the volume between the ridges is full of deformed metal.

The smaller chamfer angles or the arcuate ridge extension result in more lateral material flow in relation to axial flow and therefore exhibited a lower insertion force and a stronger union of the two articles. Chamfer angles of about 20° have been used with the resulting union being of high strength and it would appear that the more efficiently the material in interference with the ridges upon insertion can be directed to the grooves (i.e., minimizing axial metal flow), the stronger the resulting union between the two articles and the lower the required insertion force.

The strength of the resulting union is measured by the force required to extract the member from the cavity after it has been inserted. Surprisingly, the force required to extract the inserted member does not diminish catastrophically after extraction is initiated. The following table shows the insertion and extraction loads of a hardened steel member forced into a cylindrical cavity of approximately the same area (~0.6 in²) within a mild steel (1020) plate.

The table illustrates that the primary force holding the member 10 within the cavity after insertion is the metal within the grooves 27 that must flow laterally if the member is to be inserted further or extracted. The amount of lateral material flow is proportional to the depth of insertion; however, as the table illustrates, the force required to remove the member does not decrease suddenly upon application of an extracting force but retains a relatively high restraining force until the depth of insertion is minimal whereupon the member is then suddenly extracted from the cavity.

Table 1

| Fastener Position in Hole inch | Loads, lb., for Fastener Insertion and Removal (a,b) | |
|---|---|---|
| | Insertion | Removal |
| (Entry) | | |
| 0.01 | 2,000 | — |
| 0.02 | 3,000 | — |
| 0.1 | 12,000 | — |
| 0.2 | 19,000 | — |
| 0.3 | 24,000 | 2,000 |
| 0.4 | 26,000 | 3,000 |
| 0.5 | 29,000 | 4,000 |
| 0.6 | 31,500 | 4,000 |
| 0.7 | 33,000 | 5,000 |
| 0.8 | 34,000 | 5,500 |
| 0.85 | 34,000 | 6,000 |
| 0.90 | 33,000 | 7,000 |
| 0.99 | 29,500 | 7,000 |
| 1.0 | 29,000 | — |

(a) Insertion and removal speeds were 0.2-inch per minute
(b) Arcuate ridge transition The initial size of the cavity affects both the required insertion force and the load required for extraction. If the cross-sectional area of the cavity is less than that of the cross-sectional area of the member, then the insertion will induce substantial axial material flow as well as the lateral flow that provides the locking engagement. This unnecessarily increases the insertion force without the benefit of increasing the extraction force. The present invention is clearly operable using such a cavity as long as the material defining the cavity can accommodate, by material flow, the insertion of the member as well as remain intact under the required insertion forces. Where the cross-sectional area of the cavity is approximately equal to that of the member, the induced flow is substantially lateral and the resulting union of the member within the cavity exhibits a high extraction force. The area of the cavity may be greater than the area of the member with the insertion load decreasing as the cavity becomes larger for a given member. The induced material flow is primarily lateral; however, if the area of the cavity is greater than the area of the member inserted therein by approximately 10 percent, the extraction load is reduced since the valleys are not completely full of cavity material and the amount of material to be moved during extraction is reduced.

Since the forces resisting insertion are generated by resistance to material flow within the grooves, the material defining the second member or cavity must be ductile to assure ready insertion. While the ductility may be induced by local heating or may be inherent in the material, clearly the material surrounding the member must flow into the grooves on the member and be further deformed by the grooves as the member is inserted. When the cavity is in a relatively non-ductile material, it can be serrated or broached to a cross-sectional shape matching the cross-sectional shape of the member at its entry end. In this manner the relatively large material flow normally associated with the insertion of the member, due to the deflection of material on each side of the ridge 21, is minimized and substantially all material flow is lateral within the grooves 27. In addition, the change in cross-sectional shape of the grooves may be small for relatively non-ductile material so as to limit the deformation to an amount below that which would induce cracking of the material deformed within the grooves upon insertion.

For the purposes of this invention it should be understood that a "ductile" material exhibits at least a 10 percent elongation in a conventional tensile test while a "relatively ductile" material exhibits between 5 percent and 10 percent elongation in such a test. A material having a ductility less than 5 percent is brittle and the deformation required to provide the joining must be limited.

This can be accomplished using the concept of the present invention by limiting the change in groove shape between the ridges or using large numbers of relatively small ridges that require only minimal lateral movement of material into the areas between the ridges.

The figures illustrate only one means of forming grooves between the ridges having a constant cross-sectional area and sequentially changing cross-sectional shape. The embodiment shown includes the line of intersection of the sides of the ridges to effect such a change in shape. The material within the grooves so formed is deformed laterally on insertion and extraction thereby joining the two articles. The angular inclination of the nonparallel grooves affects the amount of induced circumferential metal flow. Angular inclination of the groove is defined as the angle between the root of the groove between the ridges and the longitudinal axis of the ridge itself. The typical application for the invention will be operable with a very small angle between the grooves and the adjacent ridge though such grooves would generate little circumferential metal flow and the union between the members would not be strong. This could be adequate in some applications or the member could be made long thereby causing a larger amount of material to deform over the length of the inserted member that would flow and resist extraction of the inserted member. If the angular inclination is large, then the insertion force will be increased and the material defining the cavity must have sufficient ductility to withstand large amounts of induced circumferential flow. While the invention is clearly operable over a broad range of groove inclination, it is evident that where the angle between the root of the groove and the longitudinal axis of the ridge is less than 10° the invention will show the optimum combination of low insertion force and high extraction force without requiring use of a material having unusually high ductility or for pre-forming the cross-section of the cavity.

It should be understood that the preceding description has shown several embodiments of the present invention and modifications may be made to such embodiments that will remain within the scope of the invention and the appended claims.

I claim:

1. A fastener having an elongated portion for insertion into a cavity, said elongated portion including: a plurality of ridges parallel to one another and parallel to the longitudinal axis of said elongated portion; said ridges defining a groove between each of said ridges; said grooves having, along the longitudinal axis of said elongated portion, substantially constant cross-sectional area and a substantial sequential change in cross-sectional shape; and means on the ends of said ridges for deflecting material defining said cavity into said grooves.

2. The fastener of claim 1 wherein said grooves and ridges are triangular in cross-section with the roots of the triangular grooves at an angle to the peaks of the ridges.

3. The fastener of claim 2 wherein said angle is less than 10°.

4. The fastener of claim 1 wherein said deflecting means is a chamfer on said ridges of less than 45° from the longitudinal axis of said elongated portion.

5. The fastener of claim 1 wherein said deflecting means comprises an arcuate termination of said ridges.

* * * * *